Jan. 25, 1966     D. O. WORLEY     3,230,986
BOTTLE DRAINING RACK
Filed Aug. 27, 1963
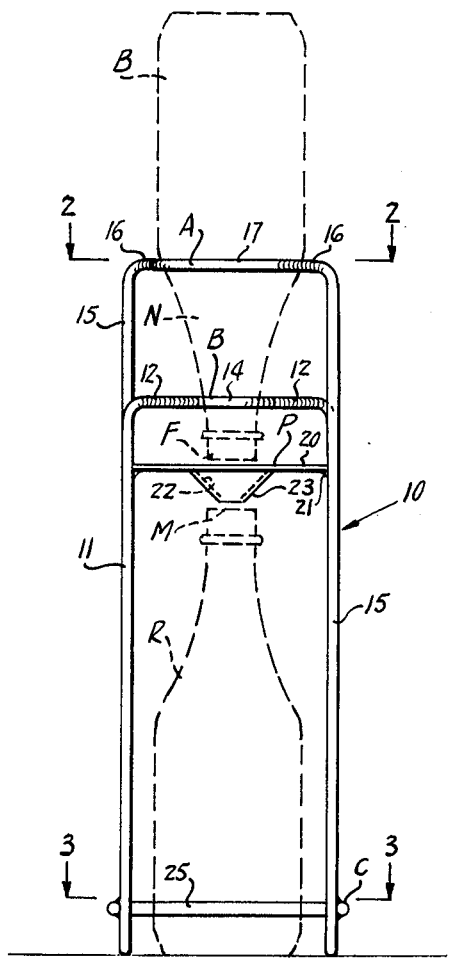
FIG. 1
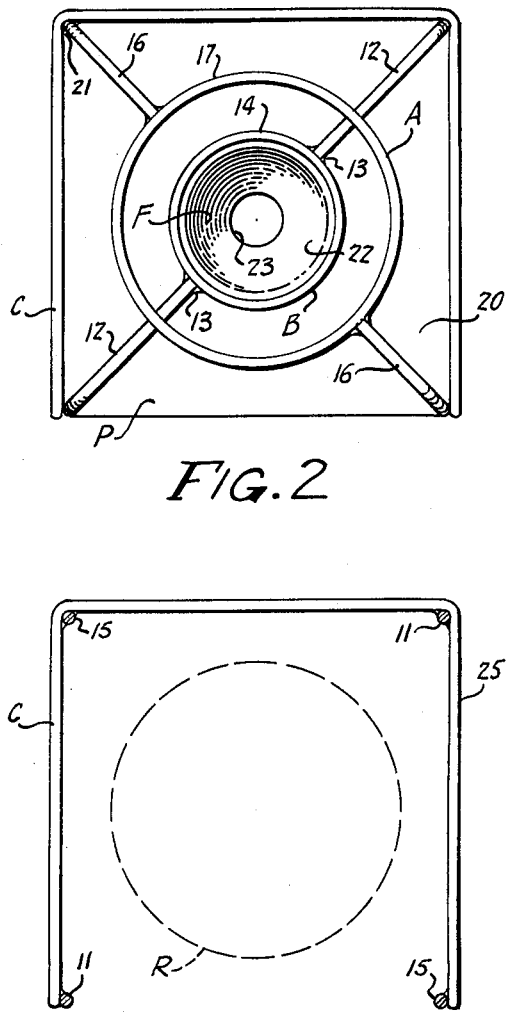
FIG. 2
FIG. 3
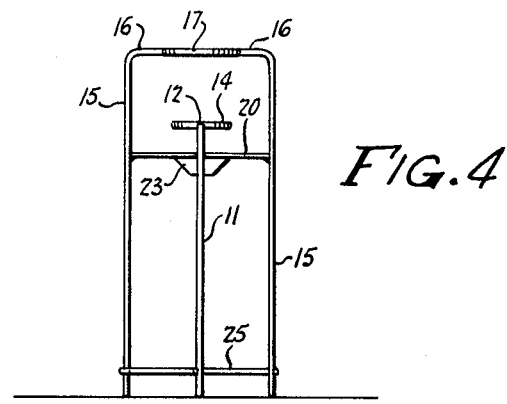
FIG. 4
INVENTOR.
DEAN O. WORLEY
BY
Kimmel & Crowell
ATTORNEYS.

United States Patent Office 3,230,986
Patented Jan. 25, 1966

3,230,986
BOTTLE DRAINING RACK
Dean O. Worley, Citrus Heights, Calif.
(314 21st St., Sacramento, Calif.)
Filed Aug. 27, 1963, Ser. No. 304,885
2 Claims. (Cl. 141—375)

This invention relates to a bottle draining rack, and has as its primary object the provision of a rack whereby a bottle containing viscous material, such as ketchup, or the like, may be supported above a relatively full bottle so that its contents may drain thereinto, thus avoiding wastage of viscous contents in such bottles.

An additional object of the invention is the provision of a device of this character which is particularly adapted for use in restaurants or the like wherein bottles of ketchup, mustard, or similar viscous material, are relatively rapidly utilized, and wherein a customer will not exhibit the patience to remove the last dredge from a bottle, the employment of the device of the instant invention preventing material wastage over a period of time.

A further object of the invention is the provision of a device of this character which is sturdy and durable in construction, reliable and efficient in operation, which is readily cleaned and sterilizable, and which may be employed repeatedly or continuously without appreciable deterioration due to wear.

Other objects reside in the combination of elements, arrangements of parts, and features of construction, all as will be more fully pointed out hereinafter, and disclosed in the accompanying drawing wherein there is shown a preferred embodiment of this inventive concept.

In the drawings:

FIGURE 1 is a side elevational view of one form of bottle draining rack constructed in accordance with the instant invention;

FIGURE 2 is a top plan view, on an enlarged scale, taken substantially along the line 2—2 of FIGURE 1, as viewed in the direction indicated by the arrows;

FIGURE 3 is a sectional view taken substantially along the line 3—3 of FIGURE 1, as viewed in the direction indicated by the arrows; and FIGURE 4 is a view, on a reduced scale, similar to FIGURE 1, but taken at a 45° angle relative thereto.

Similar reference characters refer to similar parts throughout the several views of the drawings.

Having reference now to the drawings in detail, a bottle draining rack of the instant invention is generally indicated at 10, and comprises a first pair of uprights or legs 11, which are bent inwardly at their upper extremities, as at 12, where the extremities of the inwardly bent portion are in confronting relation, having their ends connected as by welding or soldering 13 to a first bottle supporting ring 14, which is adapted to encircle the neck N of a first bottle B to be drained. A second pair of uprights 15 are disposed at 90° angles to the uprights 11 to form a square or quadrangle, and extend a substantial distance above the portions 12, being inwardly turned as at 16 at their upper ends, and connected to a second bottle supporting ring 17 which is of larger diameter than the bottle supporting ring 14, and which is adapted to encircle the body of the bottle B to be drained.

A rectangular plate 20 is positioned beneath the lower bottle supporting ring 14, and is secured at its corners to each upright 11 and 15 in any desired manner, as by soldering or welding as at 21. The central portion of plate 20 is depressed as at 22 to form an inverted, frustoconical funnel like portion having an opening at its reduced extremity 23. The opening is positioned at a height to be immediately above the mouth M of a receiving bottle R which is adapted to be positioned beneath the plate.

A reenforcing wire 25 extends around three sides of the lower portion of the support formed by the uprights 11 and 15, and is secured to the uprights as by welding or soldering as at 26. The fourth side is left open to facilitate the insertion of the receiving bottle R into the space interiorly of the frame.

In the instant operation of the device a nearly or partially full receiving bottle is positioned beneath the mouth 23 of the funnel 22, and a nearly empty bottle B is inverted thereover, with its neck in the lower bottle supporting ring 14 and the upper bottle supporting ring 17 surrounding the body portion for stabilizing the same. If the bottles are left in this position for any protracted period of time, the contents of bottle B will gradually drain into bottle R so that they may be utilized from the nearly full bottle, thus precluding the wastage which is occasioned by the sticking of viscous material such as ketchup in the nearly empty bottle.

From the foregoing it will now be seen that there is herein provided an improved bottle draining rack which accomplishes all of the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative, and not in a limiting sense.

I claim:

1. A bottle draining rack comprised of a first pair of vertically extending, spaced uprights inwardly bent at approximately right angles at their upper ends with their extremities in confronting alignment, a first bottle supporting ring connected between the inwardly bent extremities adapted to surround the neck of a bottle to be drained, a second pair of vertically extending, spaced uprights disposed at 90° angles relative to said first pair of uprights to form a square, said second pair of uprights being of greater height than said first pair of uprights, and inwardly bent at their upper ends above and at right angles to the inwardly bent upper ends of said first pair of uprights with their extremities in confronting alignment, a second bottle supporting ring secured between the confronting extremities of the inwardly bent ends of said second pair of uprights, said second bottle supporting ring being of greater diameter than said first mentioned bottle supporting ring and adapted to encircle the body of a bottle to be drained, and a funnel supported between, and secured to each of, said uprights below said first bottle supporting ring at a height to be positioned above the mouth of a receiving bottle of the same size as the bottle to be drained.

2. The structure of claim 1 wherein a reenforcing member is extended around the lower portion of three sides of the square formed by said uprights, leaving the fourth side open for the insertion of a receiving bottle beneath said funnel.

References Cited by the Examiner
UNITED STATES PATENTS

| 1,657,782 | 1/1928 | Berg | 141—364 XR |
| 2,739,466 | 3/1956 | Maliniak | 141—375 XR |
| 2,767,744 | 10/1956 | Beerman | 141—375 XR |
| 2,807,290 | 9/1957 | Hearn | 141—364 XR |

LAVERNE D. GEIGER, *Primary Examiner.*